(No Model.)

A. C. GRAY.
CABLE RACK.

No. 496,381. Patented Apr. 25, 1893.

Witnesses:
Chas. G. Hawley.
Ella Edler.

Inventor:
Albert C. Gray.
By George P. Barton
Attorney.

UNITED STATES PATENT OFFICE.

ALBERT C. GRAY, OF PITTSBURG, PENNSYLVANIA, ASSIGNOR TO THE WESTERN ELECTRIC COMPANY, OF CHICAGO, ILLINOIS.

CABLE-RACK.

SPECIFICATION forming part of Letters Patent No. 496,381, dated April 25, 1893.

Application filed October 22, 1888. Serial No. 288,807. (No model.)

*To all whom it may concern:*

Be it known that I, ALBERT C. GRAY, a citizen of the United States, residing at Pittsburg, in the county of Allegheny and State of Pennsylvania, have invented a certain new and useful Improvement in Cable-Racks, of which the following is a full, clear, concise, and exact description, reference being had to the accompanying drawings, forming a part of this specification.

My invention relates to cable racks used in connection with telephone exchange switchboards, and its object is to provide means for supporting the cables of electric conductors at the rear of the switch-board in such manner that they may be within small space and at the same time readily accessible from the rear.

My invention consists in upright rods placed at the rear of the spring jack switches and as near thereto as convenient in combination with adjustable brackets carried by said rods and adapted to support the cables laid thereon.

As to the state of the art prior to my invention reference is made to Letters Patent No. 385,846, granted James A. Cook and Frank B. Cook, July 10, 1888.

My invention is illustrated in the accompanying drawings in which—

Figure 1:
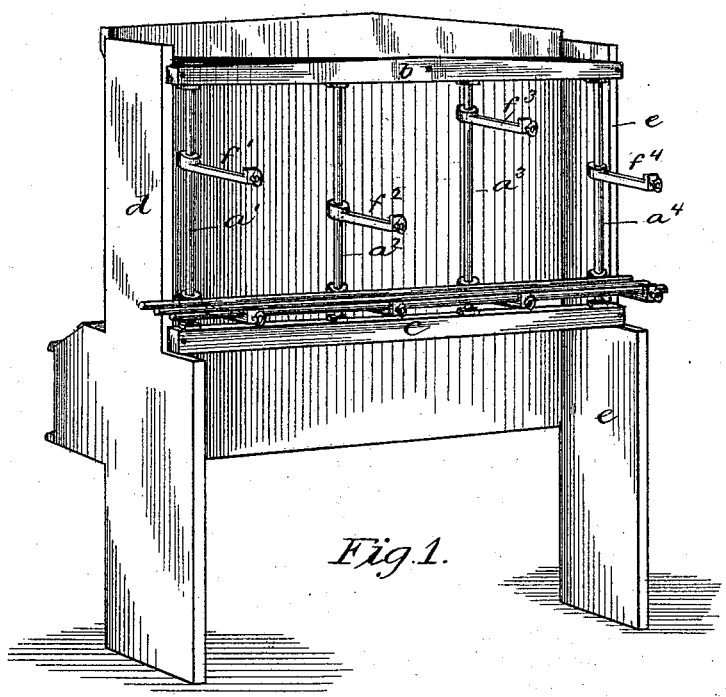
Figure 2:
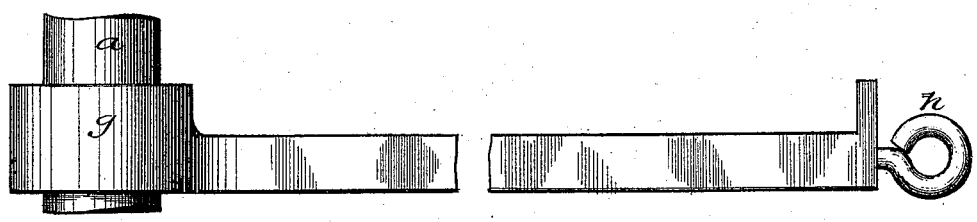
Figure 3:
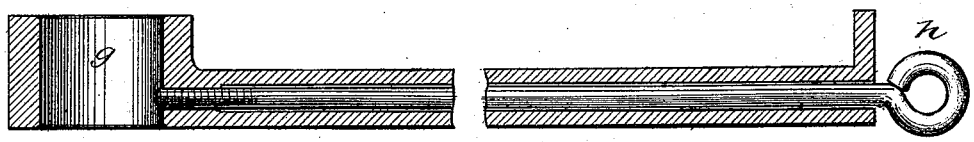
Figure 4:
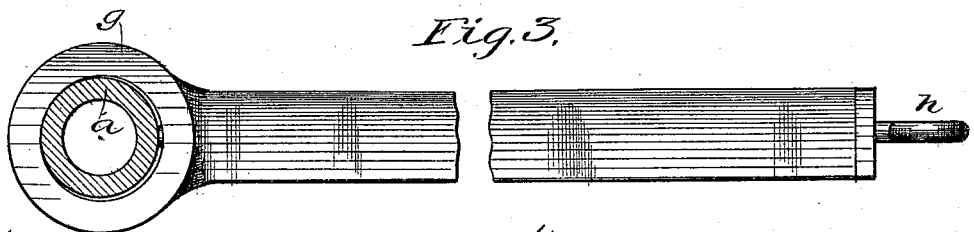

Figure 1 is a perspective view of the rear of a multiple switch board provided with my cable rack. Figs. 2, 3 and 4 are detailed views of one of the supports or brackets.

Referring now to Fig. 1, it will be seen that my rack consists of the uprights or rods $a'$, $a^2$, $a^3$, $a^4$, secured as shown between the horizontal pieces $b$ and $c$, these cross pieces $b$ and $c$ being secured to the side pieces $d$, $e$, of the switch board. The rods $a$ may be of gas pipe or other suitable material. Upon each rod $a$ I place a number of brackets $f'$, $f^2$, $f^3$, $f^4$. These brackets as shown more clearly in Figs. 2, 3 and 4, each consists of a casting preferably of brass. The pipe $a$ is inserted through the bearing sleeve or eye $g$ as shown in Figs. 2 and 4 by means of a set screw $h$, which is inserted as shown through the hole bored through the bracket; the bracket may be secured in place upon the rod $a$ in any desired position, the opening through the bracket being tapped out near the sleeve so as to form a thread corresponding to the thread upon the set screw.

In Fig. 1 I have shown three cables supported upon the brackets $f'$, $f^2$, $f^3$, $f^4$. I have not deemed it necessary to illustrate the manner of connecting the different wires of the different cables with the spring jack switches. Any well known method of making the connections between the wires of the cables and the spring jack switches may be employed. It will be understood, however, that the space at the rear of the board will be necessarily nearly filled with cables placed in horizontal layers and supported upon the brackets. The set screws, it will be observed, are always accessible at the rear of the board so that any bracket may be loosened or any series of brackets. Thus the different layers of cables may be spread apart by moving the brackets upon the tubes $a$. In this manner any cable of any layer may be made accessible.

Having thus described my invention, I claim as new and desire to secure by Letters Patent—

1. The combination with a switch board, of a cable rack placed at the rear thereof and secured thereto, said rack consisting of upright rods secured between horizontal cross pieces, bracket arms journaled upon said upright rods and adjustable thereon vertically, a set screw passing axially through said bracket arm and provided at the journal end with a thread adapted to fit an internal thread in said bracket arm, said set screw being provided at the other end with a head extending from the end of said bracket arm, said bracket arms supporting the cables placed in layers thereon, whereby the cables may be supported at the rear of the board and said bracket arms rendered adjustable from the rear of said arms while supporting the cables; substantially as described.

2. In a cable rack the combination with upright rods or tubes supported between horizontal cross pieces, of bracket arms journaled upon said upright rods, a set screw passing axially through said bracket arm and provided at the journal end with a thread adapted to fit an internal thread upon said bracket arm, said set screw being provided at its other end with a head or knob extending from the end of said bracket arm, whereby when cables are supported upon said bracket arms the same may be adjustable from the ends thereof without removing said cables; substantially as described.

In witness whereof I hereunto subscribe my name this 12th day of October, A. D. 1888.

ALBERT C. GRAY.

Witnesses:
CHAS. G. HAWLEY,
D. P. BLACK.